(12) United States Patent
Wimmer et al.

(10) Patent No.: US 11,846,943 B2
(45) Date of Patent: Dec. 19, 2023

(54) DRIVER ASSISTANCE SYSTEM INCLUDING ERROR HANDLING UNIT FOR DRIVING MODE FOR HANDS-FREE DRIVING

(71) Applicant: Robert Bosch GmbH, Stuttgart (DE)

(72) Inventors: Andreas Wimmer, Suzhou (CN); Kathrin Zeeb, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 87 days.

(21) Appl. No.: 17/234,006

(22) Filed: Apr. 19, 2021

(65) Prior Publication Data
US 2022/0026903 A1 Jan. 27, 2022

(30) Foreign Application Priority Data
Jul. 7, 2020 (CN) .......................... 202010645309.1

(51) Int. Cl.
| | |
|---|---|
| *G05D 1/00* | (2006.01) |
| *B60W 60/00* | (2020.01) |
| *B60W 50/02* | (2012.01) |
| *G05D 1/02* | (2020.01) |
| *B60W 50/14* | (2020.01) |
| *B60W 30/09* | (2012.01) |

(52) U.S. Cl.
CPC ........... *G05D 1/0061* (2013.01); *B60W 30/09* (2013.01); *B60W 50/0205* (2013.01); *B60W 50/14* (2013.01); *B60W 60/0053* (2020.02); *G05D 1/0231* (2013.01); *G05D 1/0257* (2013.01); *B60W 2050/0215* (2013.01); *B60W 2420/42* (2013.01); *B60W 2420/52* (2013.01)

(58) Field of Classification Search
None
See application file for complete search history.

(56) References Cited

U.S. PATENT DOCUMENTS

| | | | |
|---|---|---|---|
| 2015/0120124 A1* | 4/2015 | Bartels .................. | B60W 50/10 701/23 |
| 2016/0001781 A1* | 1/2016 | Fung ...................... | G16H 50/20 701/36 |
| 2016/0114811 A1* | 4/2016 | Matsuno ............... | B60W 10/20 701/23 |
| 2017/0057510 A1* | 3/2017 | Herbach ............. | B60W 30/181 |

(Continued)

*Primary Examiner* — Anne Marie Antonucci
*Assistant Examiner* — Kyle S Park
(74) *Attorney, Agent, or Firm* — NORTON ROSE FULBRIGHT US LLP; Gerard Messina

(57) ABSTRACT

A driver assistance system for motor vehicles. The system includes a vehicle surroundings sensor system (for detecting vehicle surroundings information which includes multiple sub-sensor systems, in a driving mode for hands-free driving, a vehicle guidance being carried out based on vehicle surroundings information detected by the vehicle surroundings sensor system, the vehicle guidance encompassing functions for the vehicle transverse guidance and for the vehicle longitudinal guidance. An error handling unit is configured, in the driving mode for hands-free driving, to maintain the vehicle guidance with different restrictions of functions of the vehicle guidance, and to output a vehicle guidance take-over request to a person driving the vehicle, in different failure scenarios of sub-sensor systems of the vehicle surroundings sensor system.

11 Claims, 1 Drawing Sheet

(56) References Cited

U.S. PATENT DOCUMENTS

| | | | | |
|---|---|---|---|---|
| 2017/0169627 A1* | 6/2017 | Kim | ................... | G01S 13/862 |
| 2019/0185018 A1* | 6/2019 | Tao | ................... | B60W 50/14 |
| 2019/0197324 A1* | 6/2019 | Ji | ................... | G06V 20/584 |
| 2020/0031362 A1* | 1/2020 | Lee | ................... | B60W 50/14 |
| 2020/0307646 A1* | 10/2020 | Kato | ............... | B60W 60/0054 |

* cited by examiner

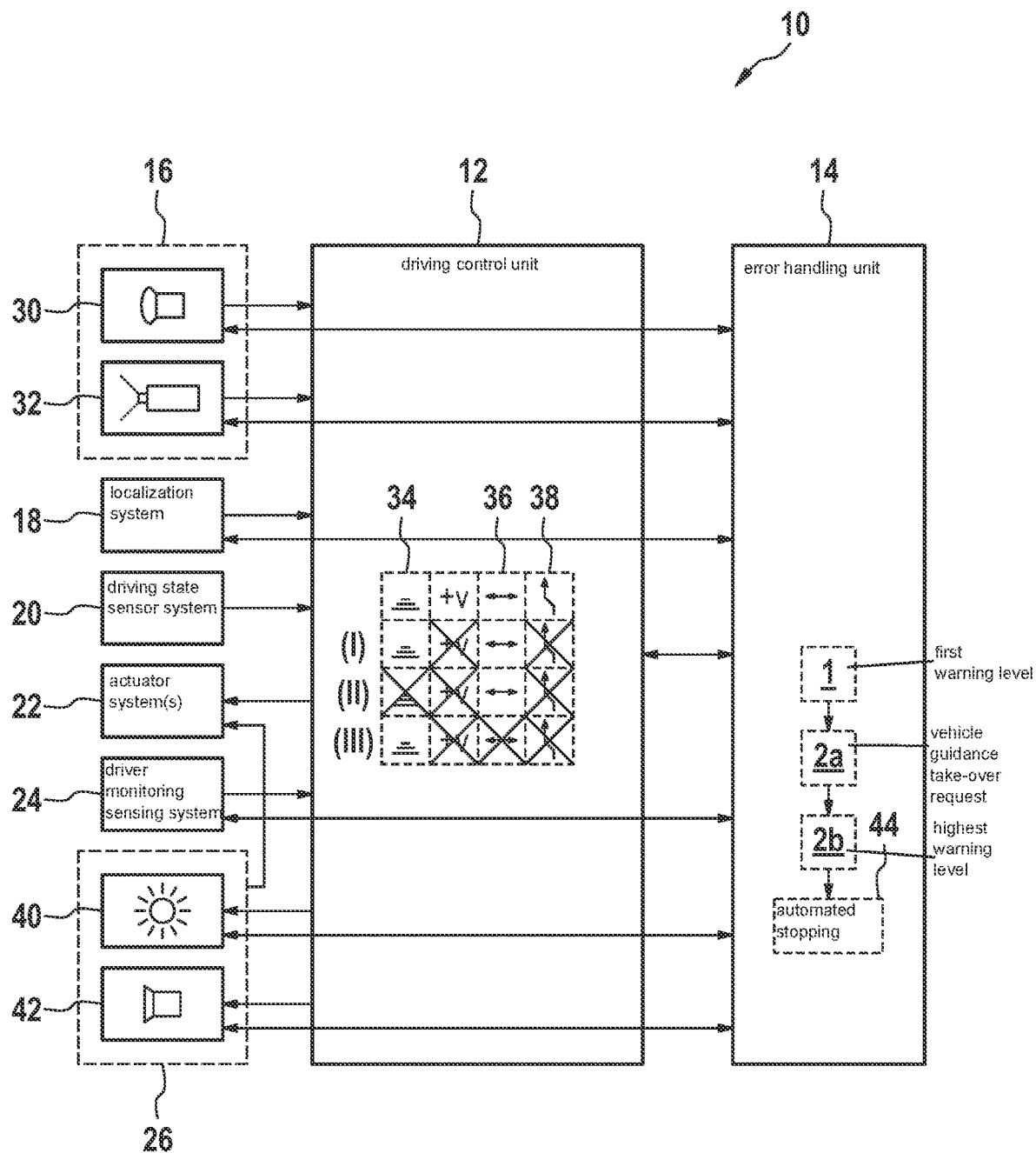

DRIVER ASSISTANCE SYSTEM INCLUDING ERROR HANDLING UNIT FOR DRIVING MODE FOR HANDS-FREE DRIVING

CROSS REFERENCE

The present application claims the benefit under 35 U.S.C. § 119 of China Patent Application No. CN 202010645309.1 filed on Jul. 7, 2020, which is expressly incorporated herein by reference in its entirety.

FIELD

The present invention relates to a driver assistance system for motor vehicles, including vehicle surroundings sensors for detecting vehicle surroundings information, the vehicle surroundings sensors including multiple sub-sensors.

BACKGROUND INFORMATION

Vehicles of the "Cadillac" brand are available with a driver assistance system for hands-free driving with the designation "Super Cruise." The use of the driver assistance system for hands-free driving is limited to certain multi-lane long distance traffic roads (highways).

Furthermore, vehicles of the "Nissan" brand are offered with a driver assistance system for semi-automated driving in a lane on the expressway under the designation "ProPilot."

SUMMARY

It is an object of the present invention to provide a driver assistance system having enhanced safety.

This object may be achieved by a driver assistance system in accordance with the present invention. In accordance with an example embodiment of the present invention, the driver assistance system is configured, in a driving mode for hands-free driving, to carry out a vehicle guidance based on vehicle surroundings information detected by the vehicle surroundings sensors, the vehicle guidance encompassing functions for vehicle transverse guidance and for vehicle longitudinal guidance, the driver assistance system including an error handling unit which is configured, in the driving mode for hands-free driving, to maintain the vehicle guidance by the driver assistance system with different restrictions of functions of the vehicle guidance, and to output a vehicle guidance take-over request to a person driving the vehicle, in different failure scenarios of sub-sensors of the vehicle surroundings sensors.

The vehicle surroundings sensors including multiple sub-sensors may also be referred to as a vehicle surroundings sensor system, and the sub-sensors may be referred to as sub-sensor systems.

The vehicle guidance or the guidance of the vehicle may also be referred to as driving the vehicle. In particular, it may be an autonomous or automatic driving and/or autonomous/automatic guidance of the vehicle.

The driving mode for hands-free driving is preferably a driving mode for driving forward, not for driving backward.

The driving mode for hands-free driving may, in particular, be a driving mode for hands-free driving on roads (in particular motorways) including directional traffic lanes which are structurally separated from one another.

During hands-free driving, the driver assistance system is dependent on comprehensive information, in particular, about the vehicle surroundings. In the failure scenarios (and, if necessary, in the error scenarios), the vehicle guidance is at least maintained within a limited scope by the driver assistance system. In this way, it is possible to trigger vehicle guidance take-over requests using different warning levels (urgency levels) and, where necessary, to limit system functionalities, for example depending on the severity of the failure or of an error and/or depending on which system component of the driver assistance system is affected.

In that the error handling unit is configured to maintain the vehicle guidance by the driver assistance system with different restrictions of functions of the vehicle guidance, a graduated response of the error handling unit to the different failure scenarios is made possible. In particular, the vehicle guidance may be maintained as much as possible with limited functions, while the person driving the vehicle is being prompted by the vehicle guidance take-over request to take over the vehicle guidance. Compared to a non-graduated response, during which the driving mode for hands-free driving would be deactivated with every failure of a sub-sensor system of the vehicle surroundings sensor system, a higher safety of the vehicle guidance is thus achieved, in particular, during the transition of the vehicle guidance from the driver assistance system to the person driving the vehicle in the event of a failure or partial failure of the vehicle surroundings sensor system. The person driving the vehicle may also be referred to as driver.

The maintenance of the vehicle guidance by the driver assistance system with different restrictions of functions of the vehicle guidance is preferably limited to a time period of a waiting duration, to allow the person driving the vehicle to take over the vehicle guidance during the waiting duration. The maintenance of the vehicle guidance by the driver assistance system thus takes place during a limited time period.

Advantageous specific embodiments and refinements of the present invention are described herein.

In accordance with an example embodiment of the present invention, the vehicle surroundings sensor system preferably encompasses a sub-sensor system in the form of a front radar and a sub-sensor system in the form of an optical system.

I In accordance with an example embodiment of the present invention, in the driving mode for hands-free driving, the error handling unit is preferably configured to maintain the vehicle guidance by the driver assistance system at least within the scope of a vehicle longitudinal guidance in a failure scenario in which a failure of the optical system is detected. The vehicle longitudinal guidance may, for example, be maintained based on vehicle surroundings information detected by the front radar.

The maintained vehicle longitudinal guidance may be a vehicle longitudinal guidance without acceleration. Here and elsewhere, the term "acceleration" refers to a positive longitudinal acceleration, in particular a longitudinal acceleration with an active increase in the velocity of the vehicle.

The optical system may, in particular, encompass a front video system and/or a front LIDAR system.

The optical system may, for example, encompass an optical system for detecting objects, in particular objects in the form of vulnerable road users (VRU), roadway boundaries, a lane and/or traffic signs.

In the event of a failure of an optical system, the vehicle longitudinal guidance may be maintained in a safe manner due to the availability of the front radar. For a limited time period, a vehicle transverse guidance, based on vehicle surroundings information detected by the front radar, may also be maintained, if necessary.

In one or multiple specific embodiment(s) of the present invention, the error handling unit, in the driving mode for hands-free driving, is configured, in a failure scenario in which a failure of the optical system is detected, to maintain the vehicle guidance by the driver assistance system at least within the scope of a vehicle longitudinal guidance and a limited vehicle transverse guidance, based on vehicle surroundings information detected by the front radar, the limited vehicle transverse guidance being limited to a vehicle transverse guidance without lane change, i.e., without automatic lane change.

A vehicle transverse guidance without lane change shall, in particular, be understood to mean a vehicle transverse guidance without automatic lane change during which, however, a lane-keeping function, for example, may be active. During the limited vehicle transverse guidance, which is limited to a vehicle transverse guidance without lane change, for example, lane changes for an automatic passing maneuver may be excluded.

In one or multiple specific embodiment(s) of the present invention, the error handling unit is configured, in the driving mode for hands-free driving, to maintain the vehicle guidance by the driver assistance system within the scope of a vehicle guidance without acceleration, in a failure scenario in which a failure of the front radar is detected. The vehicle longitudinal guidance may, for example, be maintained based on vehicle surroundings information detected by the optical system.

This may be a vehicle guidance with vehicle transverse guidance, in particular without lane change.

The vehicle guidance may encompass a vehicle longitudinal guidance without acceleration. As an alternative, the vehicle guidance may be a vehicle guidance without vehicle longitudinal guidance.

In one or multiple specific embodiment(s) of the present invention, the error handling unit is furthermore configured, in the driving mode for hands-free driving, in an error scenario in which a functional degradation of the front radar is detected, to maintain the vehicle guidance by the driver assistance system within the scope of a vehicle guidance without acceleration, and to output a vehicle guidance take-over request to a person driving the vehicle with a lower warning level than in the case of the failure scenario in which a failure of the front radar is detected. For example, a decalibration of the front radar may be detected as the functional degradation of the front radar.

In the failure scenario in which a failure of the front radar is detected, the vehicle guidance take-over request is thus output to the person driving the vehicle with a relatively higher warning level, and in the error scenario in which a functional degradation of the front radar is detected, the vehicle guidance take-over request is output with a lower warning level relative to the higher warning level.

The lower warning level is preferably associated with a longer waiting duration for the take-over of the vehicle guidance by the person driving the vehicle than the higher warning level.

In one or multiple specific embodiment(s) of the present invention, the driver assistance system includes a localization system for providing localization information, the driver assistance system being configured, in the driving mode for hands-free driving, to carry out the vehicle guidance based on the vehicle surroundings information detected by the vehicle surroundings sensor system, and based on localization information provided by the localization system, the error handling unit furthermore being configured, in the driving mode for hands-free driving, in a failure scenario in which a failure of the localization system is detected, to maintain the vehicle guidance by the driver assistance system based on vehicle surroundings information detected by the vehicle surroundings sensor system, and to output a vehicle guidance take-over request to a person driving the vehicle. The localization information may, in particular, encompass localization information about the host vehicle. The localization system may, in particular, include a satellite positioning system, e.g., global positioning system (GPS), a map information system for providing map information which relates to the location of the host motor vehicle, and/or a location limitation system (geofencing system) for locally restricting the driving mode for hands-free driving.

In one or multiple specific embodiment(s) of the present invention, the driver assistance system includes a driver monitoring sensor system, the error handling unit furthermore being configured, in the driving mode for hands-free driving, in a failure scenario in which a failure of the driver monitoring sensor system or a failure of a sub-sensor system of the driver monitoring sensor system is detected, to maintain the vehicle guidance by the driver assistance system, and to output a vehicle guidance take-over request to a person driving the vehicle.

The driver monitoring sensor system may, in particular, include a sensor system or sub-sensor system or respective sensor systems/sub-sensor systems for detecting a presence, an attention and/or a drowsiness of a person driving the vehicle.

The driver monitoring sensor system may, in particular, encompass a sensor system or sub-sensor system for detecting whether the steering wheel is being held by a person.

In one or multiple specific embodiment(s) of the present invention, the error handling unit is preferably furthermore configured to escalate the vehicle guidance take-over request using multiple warning levels when a detection of a take-over of the vehicle guidance by the person does not materialize. The detection may, for example, be a detection by the driver monitoring sensor system, in particular, by a sensor system or sub-sensor system for detecting whether the steering wheel is being held by a person.

The error handling unit is configured, for example, to detect a take-over of the vehicle guidance by the person based on a detection that the steering wheel is being held by a person. A sub-sensor system of a driver monitoring sensor system provided for this purpose may, for example, include a capacitive steering wheel sensor and/or a steering wheel torque sensor.

In the event of a failure with immediate effect on the vehicle longitudinal guidance, e.g., in the event of a failure of a front radar, the vehicle guidance take-over request may, for example, be directly triggered with a highest warning level. A vehicle guidance take-over request with the highest warning level may, for example, be a blinking or flashing optical signal to the person driving the vehicle and a (noticeable) braking jolt (brake jerk). Such a braking jolt may be understood to mean a jerky change, in particular a brief increase and then decrease, in the braking acceleration.

The multiple warning levels may, for example, include an optical signaling to the person driving the vehicle in colors that differ depending on the warning level, for example an escalation using the colors green, yellow, orange, red or using at least two or three of these colors, preferably using green, yellow or orange, and red. The vehicle guidance take-over requests may also encompass an acoustic signal or respective acoustic signals to the person driving the vehicle.

The error handling unit is preferably furthermore configured, when a detection of a take-over of the vehicle guidance by the person does not materialize during a minimum duration, to execute an automated stopping process, and to terminate the vehicle guidance by the driver assistance system, after elapse of the minimum duration. The stopping process is a stopping process for stopping the host motor vehicle. The minimum duration may, for example, start when a highest warning level has been reached. The aforementioned waiting duration may, for example, encompass the minimum duration.

In this way, the vehicle may be halted safely when the time of a waiting duration of a take-over request with the highest warning level (urgency level) has elapsed.

Preferred exemplary embodiments of the present invention are described in greater detail below based on the FIGURE.

BRIEF DESCRIPTION OF THE DRAWING

FIG. 1 shows a driver assistance system in accordance with an example embodiment of the present invention.

DETAILED DESCRIPTION OF EXAMPLE EMBODIMENTS

FIG. 1 shows a driver assistance system 10 for motor vehicles including a driving control unit 12 for a driving mode for hands-free driving and including an error handling unit 14.

Driver assistance system 10 furthermore includes a vehicle surroundings sensor system 16, a localization system 18, a driving state sensor system 20, as well as actuator systems 22 for controlling the acceleration and the braking and the steering of the host motor vehicle. Driver assistance system 10 furthermore includes a driver monitoring sensor system 24 and a vehicle guidance take-over request unit 26.

Vehicle surroundings sensor system 16 includes at least one radar sensor, in particular, a front radar 30. Vehicle surroundings sensor system 16 furthermore includes at least one optical system 32, for example in the form of a front camera or a front LIDAR. During operation of driver assistance system 10, front radar 30 and optical system 32 of driving control unit 12 provide vehicle surroundings information. The vehicle surroundings information includes, in particular, information about objects, in particular road users, road boundaries, lanes, and traffic signs.

Localization system 18 provides localization information about the host motor vehicle to driving control unit 12, for example based on map information and on position information about the motor vehicle.

Driving state sensor system 20 provides pieces of information about the driving state of the host motor vehicle, in particular, about an inherent velocity v, inertial sensor information, and the like, to driving control unit 12 in a conventional manner.

In the driving mode for hands-free driving, driving control unit 12 executes an automated vehicle guidance in that driving control unit 12 controls the host motor vehicle via actuator systems 22.

In a table, FIG. 1 schematically shows functions of the vehicle guidance which, in particular, encompass a vehicle longitudinal guidance 34, if necessary including a vehicle acceleration "+v," and a vehicle transverse guidance 36, if necessary including an automatic lane change 38. In a driving mode for hands-free driving, the described functions of the vehicle guidance may all be activated.

Vehicle guidance take-over request unit 26 includes an optical warning device 40 and an acoustic warning device 42. It is configured to output a vehicle guidance take-over request to the person driving the vehicle with a set warning level. For example, a first warning level "1" encompasses a green, blinking warning signal of optical warning device 40, as well as a warning sound of acoustic warning device 42. A vehicle guidance take-over request of a subsequent warning level "2a" includes a yellow, blinking optical signal as well as an acoustic signal, for example. A highest warning level "2b" includes, for example, a red, blinking optical signal, an acoustic warning sound, and additionally the execution of a braking jolt, vehicle guidance take-over request unit 26 activating actuator systems 22, in particular a braking device of the host motor vehicle, to execute the braking jolt.

As is schematically shown in FIG. 1 as a flowchart, error handling unit 14 is configured, during the output of a vehicle guidance take-over request, to escalate the warning level up to the highest warning level via vehicle guidance take-over request unit 26 in a temporal progression when a detection of a take-over of the vehicle guidance by the driver does not materialize. The take-over of the vehicle guidance may take place based on monitoring information of driver monitoring sensor system 24. In the process, a waiting for the duration of a particular waiting duration for the respective warning level takes place before the warning level is increased. When a minimum duration of the waiting has elapsed in the highest warning level "2b" without a take-over of the vehicle guidance by the driver having been detected, error handling unit 14 is configured to activate driving control unit 12 to execute an automated stopping process 44 to effectuate a safe stop of the vehicle, and to terminate the vehicle guidance by driver assistance system 10.

In one example, a work process of error handling unit 14 in the driving mode for hands-free driving includes the following steps:

Failure scenario (I): In a failure scenario in which error handling unit 14 detects a failure of optical system 32, error handling unit 14 activates driving control unit 12 to maintain the vehicle guidance within the scope of a vehicle longitudinal guidance without acceleration and a limited vehicle transverse guidance without automatic lane change. At the same time, error handling unit 14 activates vehicle guidance take-over request unit 26 to output a vehicle guidance take-over request of warning level "2a," and escalates it in the described manner. Pieces of information of the front radar regarding lateral positions of objects may be used for vehicle guidance with certain restrictions until the human driver takes over the guidance of the vehicle or the automatic stopping is executed.

Failure scenario (II): In a failure scenario in which error handling unit 14 detects a failure of front radar 30, error handling unit 14 is configured to activate driving control unit 12 to maintain a vehicle guidance within the scope of a vehicle transverse guidance without automatic lane change and without vehicle longitudinal guidance. At the same time, a vehicle guidance take-over request of highest warning level "2b" is triggered. Since it is no longer possible to properly perform a vehicle longitudinal guidance due to the failure of front radar 30, a coasting of the vehicle or a moderate deceleration of the vehicle takes place, while the waiting duration of the warning level "2b" is awaited to thereafter execute the automatic stopping if the driver does not intervene.

The work method may furthermore include one or multiple of the step(s) described hereafter.

Error scenario (III): In the event of an error scenario in which error handling unit 14 detects a functional degradation of front radar 30, such as a decalibration, error handling unit 14 is configured to activate driving control unit 12 to maintain a vehicle longitudinal guidance without acceleration and without vehicle transverse guidance. At the same time, error handling unit 14 begins with a vehicle guidance take-over request of warning level "1."

Failure scenario (IV): In a failure scenario in which error handling unit 14 detects a failure of localization system 18, a response as in failure scenario (I) takes place, for example.

Failure scenario (V): In a failure scenario in which error handling unit 14 detects a failure of driver monitoring sensor system 24, or of a sub-sensor system thereof, error handling unit 14 is configured to activate driving control unit 12 to maintain the full scope of the driving control. At the same time, a vehicle guidance take-over request starting with warning level "1" is output.

What is claimed is:

1. A driver assistance system for a motor vehicle, comprising:
a vehicle surroundings sensor system configured to detect vehicle surroundings information, the vehicle surroundings sensor system including multiple sub-sensor systems, wherein the driver assistance system is configured, in a driving mode for hands-free driving, to carry out a vehicle guidance based on the vehicle surroundings information detected by the vehicle surroundings sensor system, the vehicle guidance encompassing functions for vehicle transverse guidance and for vehicle longitudinal guidance; and
an error handling unit configured to, in the driving mode for hands-free driving, maintain the vehicle guidance by the driver assistance system with different restrictions of the functions of the vehicle guidance, and to output a vehicle guidance take-over request to a person driving the vehicle, in different failure scenarios of the sub-sensor systems of the vehicle surroundings sensor system, wherein the vehicle surroundings sensor system includes a first sub-sensor system including a front radar and a second sub-sensor system including an optical system, the error handling unit being configured to, in the driving mode for hands-free driving:
in a failure scenario in which a failure of the front radar is detected, maintain the vehicle guidance by the driver assistance system without the vehicle longitudinal guidance and within a scope of the vehicle transverse guidance without automatic lane change, and
in a failure scenario in which a functional degradation of the front radar is detected, maintain the vehicle guidance by the driver assistance system without the vehicle transverse guidance and within a scope of the vehicle longitudinal guidance without acceleration.

2. The driver assistance system as recited in claim 1, the error handling unit being configured to, in the driving mode for hands-free driving, maintain the vehicle guidance by the driver assistance system at least within a scope of the vehicle longitudinal guidance, in a failure scenario in which a failure of the optical system is detected.

3. The driver assistance system as recited in claim 2, wherein the error handling unit is configured to, in the driving mode for hands-free driving, in the failure scenario in which the failure of the optical system is detected, maintain the vehicle guidance by the driver assistance system at least within the scope of the vehicle longitudinal guidance and a limited vehicle transverse guidance, based on the vehicle surroundings information detected by the front radar, the limited vehicle transverse guidance being limited to the vehicle transverse guidance without lane change.

4. The driver assistance system as recited in claim 1, wherein the error handling unit is configured to, in the driving mode for hands-free driving, in the failure scenario in which the functional degradation of the front radar is detected, output the vehicle guidance take-over request to the person driving the vehicle with a lower warning level than in a case of the failure scenario in which the failure of the front radar is detected.

5. The driver assistance system as recited in claim 1, wherein the driver assistance system includes a localization system configured to provide localization information, wherein the driver assistance system is configured to, in the driving mode for hands-free driving, carry out the vehicle guidance based on the vehicle surroundings information detected by the vehicle surroundings sensor system, and based on the localization information provided by the localization system, and wherein the error handling unit is configured to, in the driving mode for hands-free driving, maintain the vehicle guidance by the driver assistance system based on the vehicle surroundings information detected by the vehicle surroundings sensor system, and to output the vehicle guidance take-over request to the person driving the vehicle, in a failure scenario in which a failure of the localization system is detected.

6. The driver assistance system as recited in claim 1, wherein the driver assistance system includes a driver monitoring sensor system, and wherein the error handling unit is configured to, in the driving mode for hands-free driving, maintain the vehicle guidance by the driver assistance system, and to output the vehicle guidance take-over request to the person driving the vehicle, in a failure scenario in which a failure of the driver monitoring sensor system, or a failure of a sub-sensor system of the driver monitoring sensor system, is detected.

7. The driver assistance system as recited in claim 1, wherein the error handling unit is configured to escalate the vehicle guidance take-over request using multiple warning levels when a detection of a take-over of the vehicle guidance by the person does not materialize.

8. The driver assistance system as recited in claim 1, wherein the error handling unit is configured to, when a detection of a take-over of the vehicle guidance by the person does not materialize during a minimum duration, carry out an automated stopping process, and terminate the vehicle guidance by the driver assistance system, after elapse of the minimum duration.

9. The driver assistance system as recited in claim 1, wherein in the failure scenario including the functional degradation of the front radar, the error handling unit outputs the vehicle guidance take-over request with a first warning level, and in the failure scenario including the failure of the front radar, the error handling unit outputs the vehicle guidance take-over request with a second warning level different than the first warning level.

10. The driver assistance system as recited in claim 9, wherein for a failure of the optical system, the error handling unit outputs the vehicle guidance take-over request with a third warning level different than the first and second warning levels.

11. The driver assistance system as recited in claim 1, wherein the functional degradation of the front radar includes a decalibration of the front radar.

* * * * *